United States Patent

Quinlan et al.

[11] Patent Number: 6,077,476
[45] Date of Patent: Jun. 20, 2000

[54] AUTOCLAVE OPERATING METHOD

[75] Inventors: Michael D. Quinlan, Pittsburgh; Joseph F. Perez, Elizabeth, both of Pa.

[73] Assignee: Crucible Materials Corporation, Solvay, N.Y.

[21] Appl. No.: 09/177,653

[22] Filed: Oct. 23, 1998

[51] Int. Cl.[7] ................................................ B22F 3/12
[52] U.S. Cl. ............................ 419/25; 419/48; 419/49
[58] Field of Search .......................... 419/49, 25, 48

[56] References Cited

U.S. PATENT DOCUMENTS

| | | | |
|---|---|---|---|
| 4,032,337 | 6/1977 | Boyer | 75/226 |
| 4,359,336 | 11/1982 | Bowles | 419/49 |
| 4,629,412 | 12/1986 | Inoue et al. | 425/405 H |
| 4,756,680 | 7/1988 | Ishii | 425/78 |
| 5,118,289 | 6/1992 | Bergman et al. | 432/205 |

OTHER PUBLICATIONS

"HIP Quench Technology," *Proceedings of the International Conference on Hot Isostatic Pressing*, May 20–22, 1996, Andover, Massachusetts.

*Primary Examiner*—Ngoclan Mai
*Attorney, Agent, or Firm*—Finnegan, Henderson, Farabow, Garrett & Dunner L.L.P.

[57] ABSTRACT

A method for operating a gas pressure vessel for use in hot isostatic pressing operations. This method includes heating and gas pressurizing an interior chamber of the vessel and thereafter simultaneously removing hot gas from this interior chamber and introducing cold gas to this interior chamber.

17 Claims, 5 Drawing Sheets

AUTOCLAVE OPERATING METHOD

BACKGROUND OF THE INVENTION

1. Field of the Invention

The invention relates to a method for operating a gas pressure vessel, commonly termed an autoclave, for use in hot isostatic pressing operations.

2. Description of the Prior Art

It is well known to produce various alloy articles, such as articles of high speed steel, titanium, and super alloys, by compacting alloy powder charges in a hot isostatic pressing vessel, commonly termed an autoclave, to consolidate the articles to densities substantially 100% of theoretical density. Since autoclaves are of expensive construction and operation, it is advantageous from the standpoint of providing an economical manufacturing practice to provide for reduced time between pressing operations to in turn increase the autoclave production rate. This results in a lowering of the costs per cycle of the product produced by operation of the autoclave.

Various practices have been employed to achieve increased production rates. Specifically, practices have been employed for quickly pressurizing the autoclave, such as the use of cryogenic liquid pumps that discharge into a vaporizer to produce gas at high pressures required for the hot isostatic compaction operation. These systems convert a cryogenic liquid, such as argon which is at a relatively low pressure, into a gas at a suitably high pressure for compacting. This gas, which is discharged from a vaporizer, is introduced into the autoclave to pressurize it to the desired level for the compacting operation. In addition, practices for reducing the time for cooling the autoclave so that the consolidated product may be removed therefrom have been used to shorten the cycle time. These include flow devices, such as a fan or heat exchange, used singly or in combination, installed in the base of the autoclave for accelerating the cooling of the autoclave at the conclusion of the hot isostatic compaction operation. Although these devices are effective for the purpose, they require equipment that reduces the interior space of the vessel to in turn reduce the capacity thereof.

SUMMARY OF THE INVENTION

It is accordingly a primary object of the present invention to provide a method for autoclave operation that achieves more rapid cooling at the end of a compacting cycle, without requiring equipment that reduces the available space in the autoclave for loading of product for compaction. In this manner, quick cooling is achieved, without reducing the capacity of the autoclave.

In accordance with the method of the invention for operating a gas pressure vessel for use in hot isostatic pressing operations, the interior chamber of the autoclave is heated and gas pressurized incident to the compaction operation. After compaction is completed, the hot gas from the interior chamber of the autoclave is removed while cold gas is simultaneously introduced into the interior chamber. The cold gas is nonoxidizing.

The heating of the interior chamber of the autoclave may be to a temperature of at least 1,500° F., and gas pressurization thereof may be to a pressure of at least 14,000 psi.

The introduction of the cold gas is continued until the vessel interior chamber is cooled to a temperature at which the vessel chamber will not oxidize upon exposure to air. This temperature may be at least 650° F. The pressurizing may be to a pressure of at least 5,000 psi.

The hot gas removed from the chamber may be stored and reintroduced to the chamber during a subsequent gas pressurization thereof for a hot isostatic pressing cycle.

The chamber may be cooled to a temperature of at least 650° F. at a cooling rate of at least 150° F. per hour.

The practice of the invention in a preferred practice is used to hot isostatically press and consolidate a powder metal charge contained within the autoclave chamber.

DESCRIPTION OF THE PREFERRED EMBODIMENTS

Figure 1:
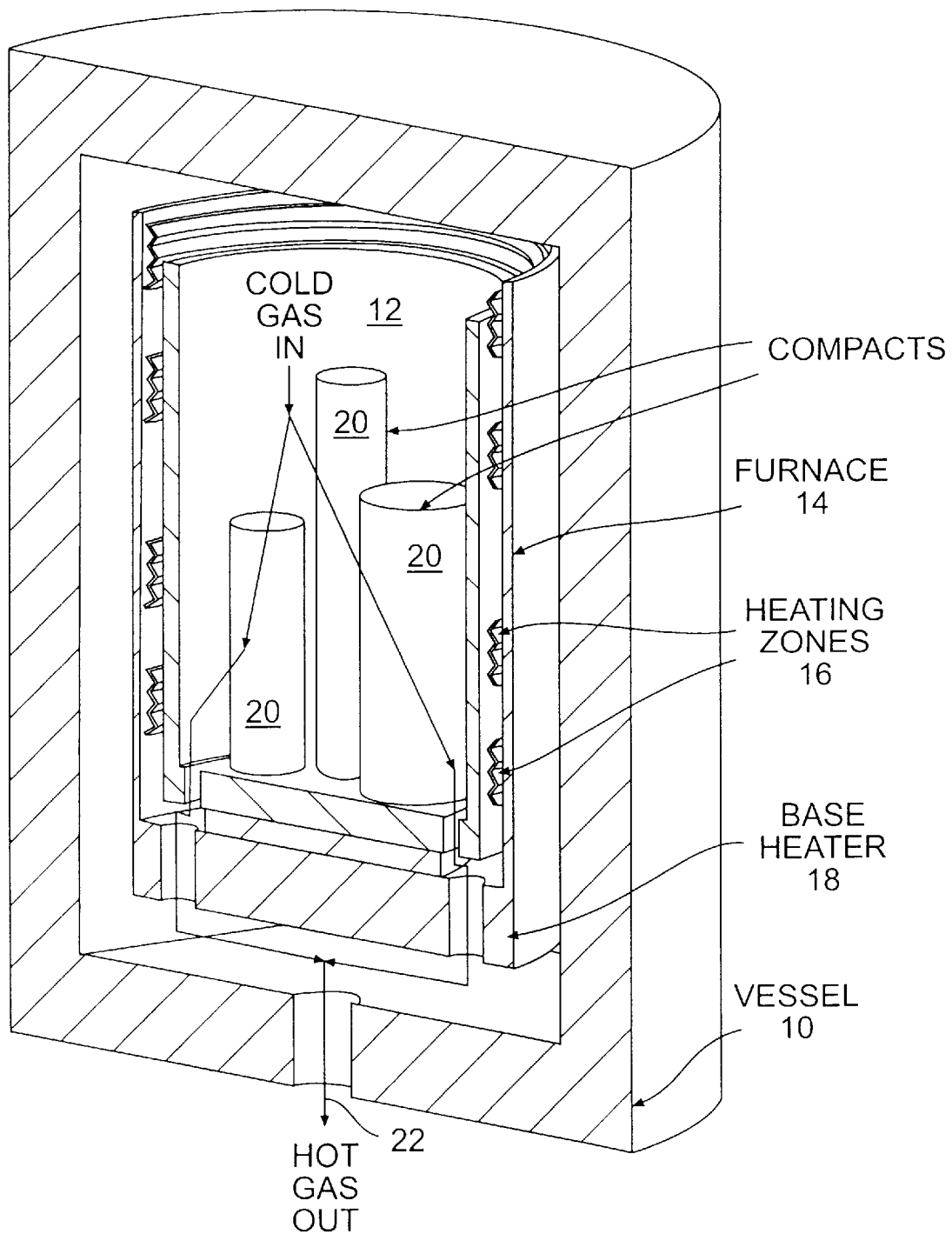
FIG. 1 is a perspective view of an autoclave, with parts broken away suitable for use with the method of the invention.

With reference to FIG. 1, an autoclave, designated generally as 10, is provided with an interior chamber 12 of a furnace 14. The inner chamber 12 of the furnace is heated by resistance heaters 16 and a base resistance heater 18. Compacts 20, which have been hot isostatically compacted, are in the chamber 12.

At the conclusion of the hot isostatic compacting operation, cold gas is introduced to the chamber 12 in the direction of the arrows and hot gas is thereby exhausted from the chamber through outlet 22, as indicated by the arrow. This hot gas may be introduced to a gas storage vessel (not shown) for reintroduction to the chamber during a subsequent hot isostatic compacting operation. The cold gas may be introduced by a pumping system (not shown) from a source (not shown) outside the autoclave.

Figure 2:
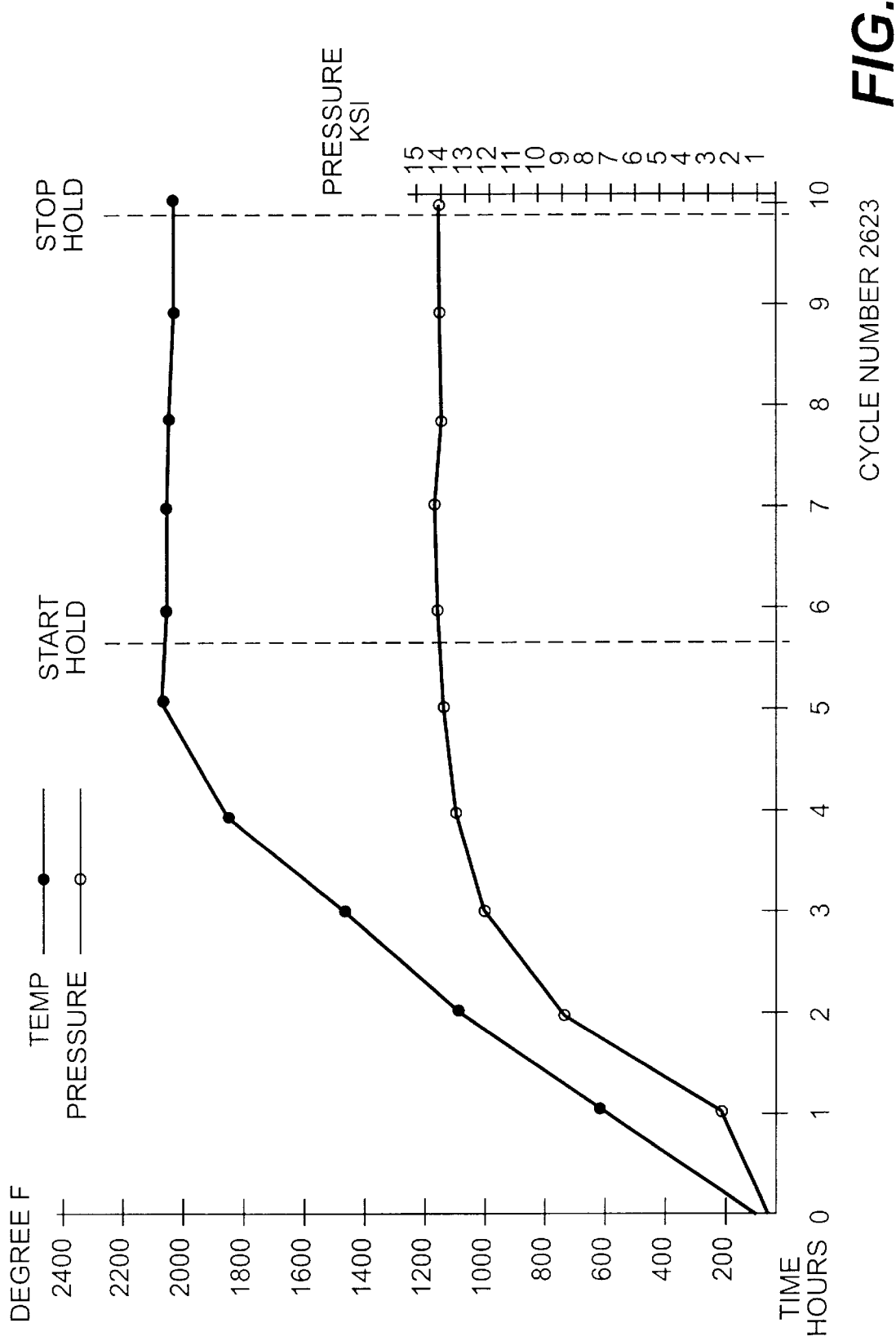
FIG. 2 is a graph showing conventional heating, pressurization, and holding profiles for heating and pressurization of an autoclave to levels required for hot isostatic compaction.
Figure 3:
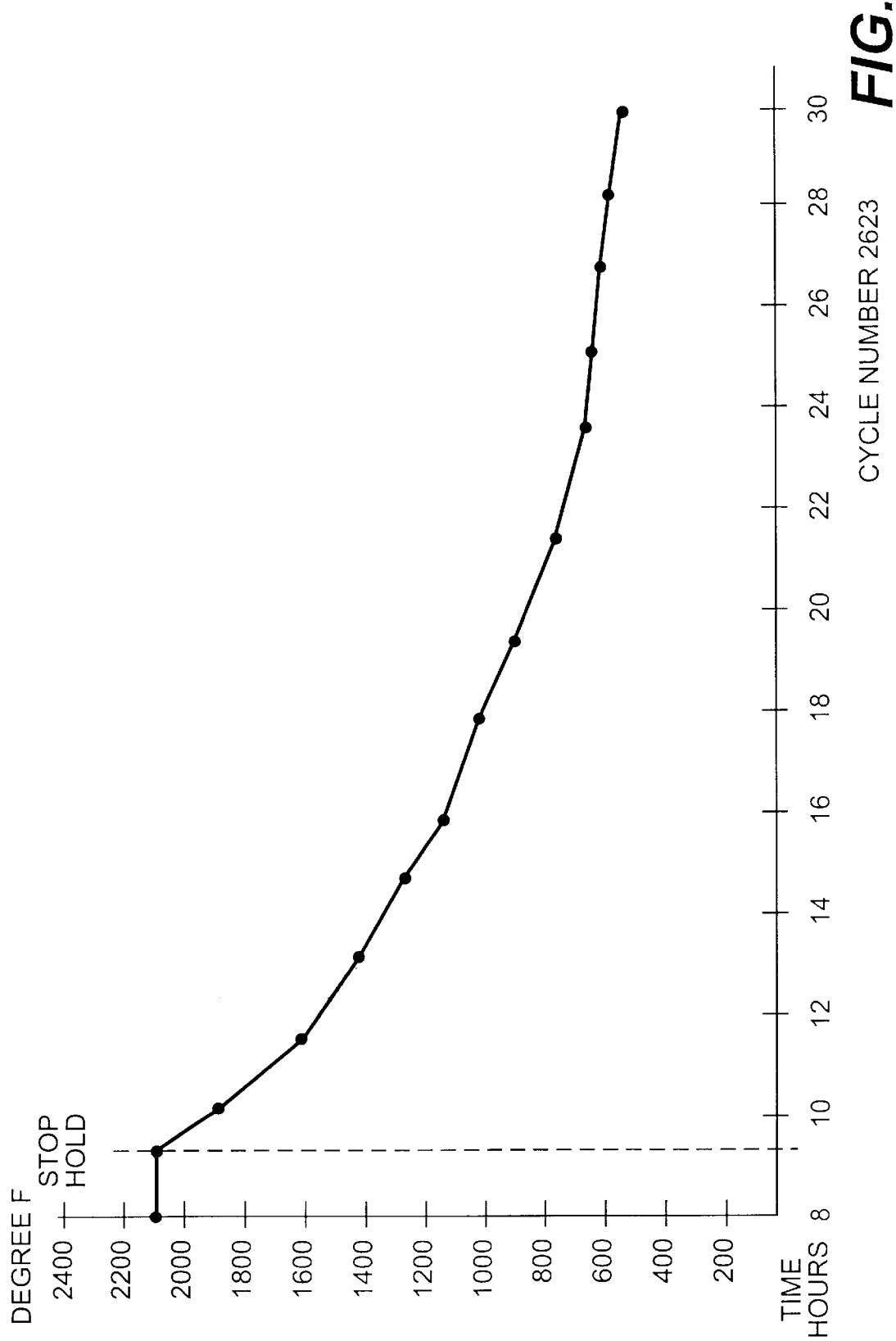
FIG. 3 is a graph showing conventional cooling profile for an autoclave upon completion of a hot isostatic pressing cycle.
Figure 4:
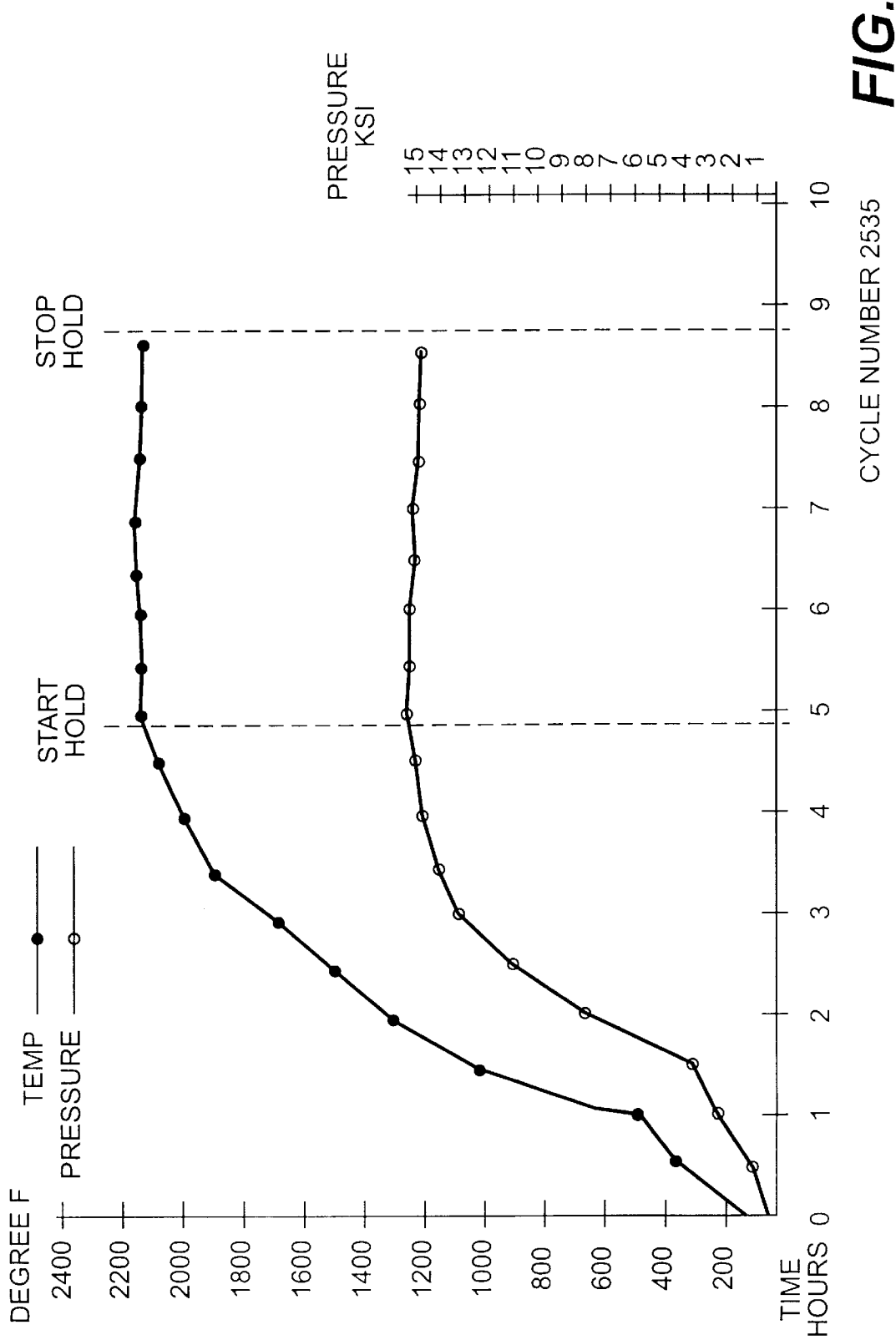
FIG. 4 is a graph similar to FIG. 2, showing heating, pressurization, and holding profiles during hot isostatic compacting.
Figure 5:
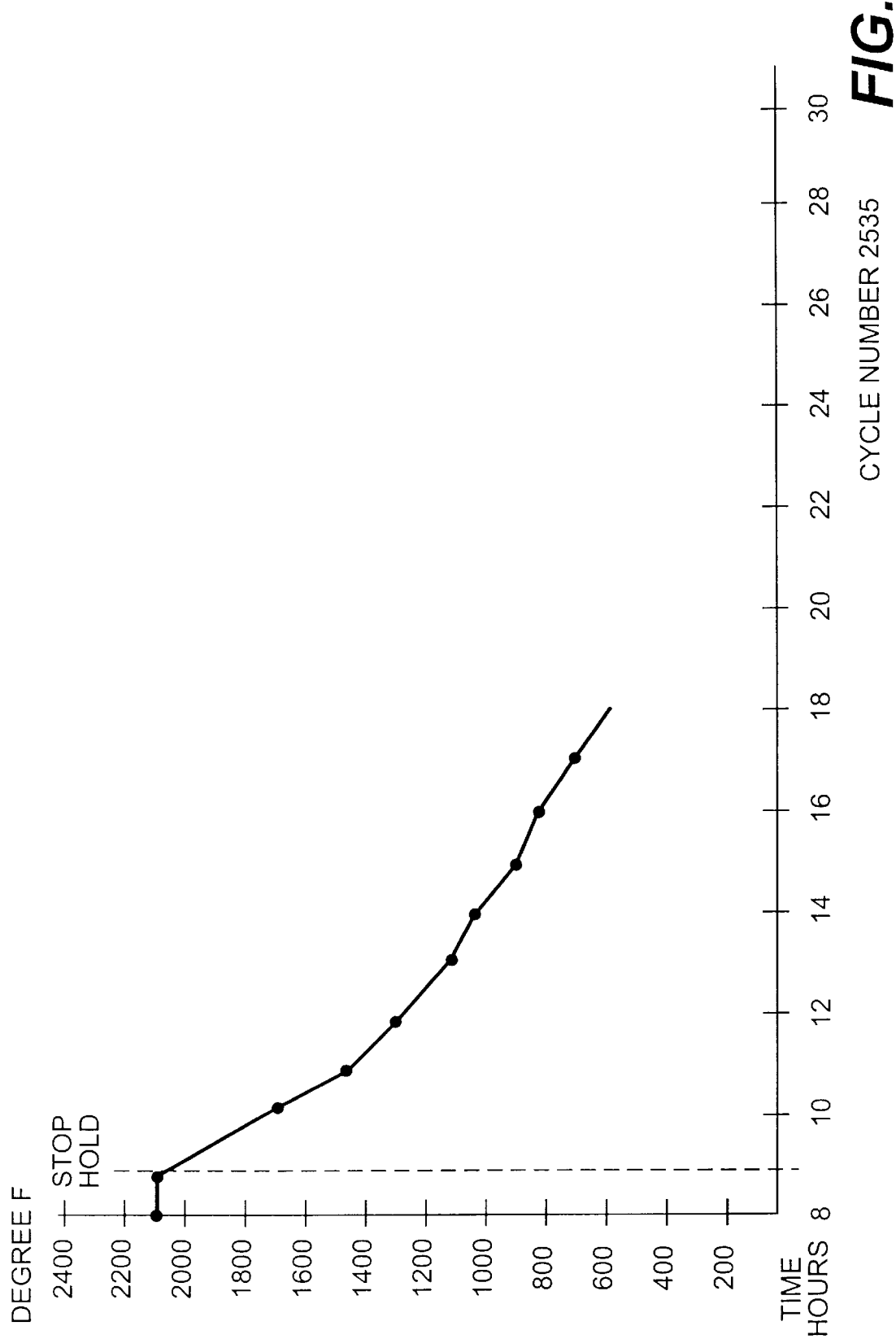
FIG. 5 is a graph showing a cooling profile for an autoclave after hot isostatic compacting achieved by the use of the cooling method in accordance with the invention.

As may be seen from FIGS. 2 and 4, the heating and pressurization cycle in accordance with the practice of the invention may be similar to conventional practice. By comparing FIGS. 3 and 5, however, the cooling time, as demonstrated in FIG. 5, with the practice of the invention, is significantly shorter than the conventional cooling time, as demonstrated by FIG. 3.

This results in a shorter hot isostatic pressing cycle by the use of the cooling practice of the invention over that achieved conventionally. Hence, increased efficiency and cost savings are achieved.

The term "cold gas" as used herein is defined as gas introduced from outside the autoclave that is of a temperature cooler than the hot gas within the autoclave chamber at the conclusion of the hot isostatic pressing operation.

What is claimed is:

1. A method for operating a gas pressure vessel having a single interior chamber for use in hot isostatic pressing operations, said method comprising heating and gas pressurizing said interior chamber of said vessel and thereafter simultaneously removing hot gas from said interior chamber of said vessel to a location exterior of said vessel and introducing cold gas to said interior chamber of said vessel.

2. The method of claim 1, wherein said gas is nonoxidizing.

3. The method of claim 2, wherein introduction of said cold gas to said vessel interior chamber is continued until said vessel interior chamber is cooled to a temperature at which said vessel interior chamber will not oxidize upon exposure to air.

4. The method of claim 3, wherein said heating is to a temperature of at least 1,500° F.

5. The method of claim 4, wherein said pressurizing is to a pressure of at least 14,000 psi.

6. The method of claim 1, wherein said hot gas removed from said chamber is stored and reintroduced to said chamber during subsequent gas pressurization thereof.

7. The method of claim 3, wherein said chamber is cooled to a temperature of at least 650° F.

8. The method of claim 7, wherein said chamber is cooled at a cooling rate of at least 150° F. per hour.

9. A method for operating a gas pressure vessel having a single interior chamber for use in hot isostatic pressing operations, said method comprising heating and gas pressurizing said interior chamber of said vessel to hot isostatically press and consolidate a powder metal charge contained within said chamber, thereafter simultaneously removing hot gas from said chamber to a location exterior of said vessel and introducing cold gas to said chamber until said chamber is cooled to a selected temperature and then removing said consolidated charge from said chamber.

10. The method of claim 9, wherein said gas is nonoxidizing.

11. The method of claim 10, wherein introduction of said cold gas to said chamber is continued until said chamber is cooled to a temperature at which said chamber will not oxidize upon exposure to air.

12. The method of claim 11, wherein said heating is to a temperature of at least 1,500° F.

13. The method of claim 12, wherein said pressurizing is to a pressure of at least 14,000 psi.

14. The method of claim 13, wherein said hot gas removed from said chamber is stored and reintroduced to said chamber during subsequent gas pressurization thereof.

15. The method of claim 11, wherein said chamber is cooled to a temperature of at least 650° F.

16. The method of claim 15, wherein said chamber is cooled at a cooling rate of at least 150° F. per hour.

17. A method for operating a gas pressure vessel for use in hot isostatic pressing operations, said method comprising heating and gas pressurizing an interior chamber of said vessel to hot isostatically press and consolidate a powder metal charge contained within said chamber, thereafter simultaneously removing hot gas from said chamber and introducing cold gas to said chamber until said chamber is cooled to a selected temperature, then removing said consolidated charge from said chamber, storing said hot gas removed from said chamber, gas repressurizing said chamber while reintroducing said stored hot gas to said chamber.

* * * * *